United States Patent [19]

deCelle

[11] Patent Number: 4,510,913
[45] Date of Patent: Apr. 16, 1985

[54] VAPORIZING FUEL SYSTEM FOR INTERNAL COMBUSTION ENGINE

[75] Inventor: Charles W. deCelle, Montgomery, Ala.

[73] Assignees: Ralph A. Franco; Lila K. Franco, both of Montgomery, Ala. ; part interest to each

[21] Appl. No.: 591,981

[22] Filed: Mar. 20, 1984

[51] Int. Cl.$^3$ .............................................. F02M 31/00
[52] U.S. Cl. ...................................... 123/557; 123/527; 123/482; 123/494; 165/51
[58] Field of Search .............. 123/527, 482, 494, 25 D, 123/25 B, 557, 558; 165/139, 51, DIG. 14

[56] References Cited

U.S. PATENT DOCUMENTS

| | | | |
|---|---|---|---|
| 3,913,547 | 10/1975 | Wentworth et al. | 123/482 |
| 4,022,173 | 5/1977 | Read | 165/52 |
| 4,086,893 | 5/1978 | Bernecker | 123/557 |
| 4,151,821 | 5/1979 | Wichman et al. | 123/557 |
| 4,259,937 | 4/1981 | Elliott | 123/557 |
| 4,303,051 | 12/1981 | Weishaar | 123/557 |
| 4,406,270 | 9/1983 | Simonson, Sr. | 123/557 |

Primary Examiner—E. Rollins Cross
Attorney, Agent, or Firm—Harvey B. Jacobson

[57] ABSTRACT

A system to supply vaporized fuel to an internal combustion engine resulting in reduced exhaust emissions and better fuel economy due to the air and fuel mixture being more homogenous and more evenly distributed to the cylinders of the engine. A vaporizing chamber receives a predetermined quantity of fuel from an injector in the form of a spray that initially impinges upon a heated plate which partially vaporizes the fuel and then passes through a chamber containing copper wool for final vaporization of the fuel. The plate, copper wool and vaporizing chamber are heated by an external jacket and an internal concentric passageway communicated with the exhaust pipe so that heated exhaust products are utilized to vaporize fuel. Metering of fuel by the injector for each vaporizing chamber is controlled by a microprocessor control unit which receives data from a venturi transducer for providing specific signals to the appropriate fuel injector so that the injectors are staged or timed to provide the proper amount of fuel vapor for a given airflow and throttle condition with the total charge of vapor being combined in the common manifold and discharged to the carburetor venturi in order to combine with controlled and measured airflow through the venturi to provide an optimum fuel/air mixture for most efficient operation of the internal combustion engine which results in increased fuel economy and reduced emissions.

9 Claims, 4 Drawing Figures

VAPORIZING FUEL SYSTEM FOR INTERNAL COMBUSTION ENGINE

BACKGROUND OF THE INVENTION

1. Field of the Invention

The present invention generally relates to a fuel system for an internal combustion engine and more specifically to a system which will provide vaporized fuel mixed with an optimum volume of air to provide efficient burning of the combustible mixture in each cylinder of the engine to enable the engine to utilize a greater proportion of the energy available in the fuel with resulting reduction in emissions and improved fuel economy. The system includes a plurality of vaporizing chambers, each having a unique construction being heated by exhaust products and supplied with air and injected liquid fuel with each of the vaporizing chambers being communicated with a common manifold that extends to and is communicated with the venturi of a carburetor whereby reduced pressure in the venturi and intake manifold of the internal combustion engine will cause flow of vaporized fuel into the venturi of the carburetor where it will be mixed with additional incoming air to provide an optimum fuel/air mixture to the engine.

2. Description of the Prior Art

Various efforts have been made over the years to increase the efficiency of internal combustion engines including arrangements to heat or vaporize fuel prior to it being aspirated into the engine. The following U.S. patents are exemplary of the prior art in this field of endeavor: U.S. Pat Nos. 1,011,641, 2,033,753, 2,247,181, 2,590,377, 3,942,499, 4,086,893.

The prior patents listed above disclose the basic concept of utilizing a vaporizing chamber associated with a heat exchange medium to at least partially vaporize the fuel prior to it being introduced into the internal combustion engine. However, the above patents do not disclose the specific arrangement of components utilized in this invention.

SUMMARY OF THE INVENTION

An object of the present invention is to provide a vaporizing fuel system for internal combustion engines utilizing a plurality of vaporizing chambers which are heated by the exhaust products from the engine and includes a fuel injector for discharging a measured quantity of fuel in a spray pattern at a precise timed interval so that all of the fuel used in the engine is completely vaporized in the vaporizing chamber for supply to the engine cylinders in an optimum fuel/air mixture for efficient combustion.

Another object of the invention is to provide a vaporizing fuel system in accordance with the preceding object in which all of the vaporizing chambers are connected in parallel with an air inlet connected to the upper end of each vaporizing chamber and a vaporized fuel outlet manifold communicated with the lower end of each vaporizing chamber with the vaporized fuel manifold being communicated with the venturi of a carburetor for mixing with additional air passing through the venturi into the intake manifold.

A further object of the invention is to provide a vaporizing fuel system in accordance with the preceding objects in which each vaporizing chamber includes a heated plate on which fuel is sprayed together with copper wool filling a substantial portion of the vaporizing chamber to assure complete vaporization of the fuel with the entire vaporizing chamber including a jacket heated by exhaust products and an internal heating pipe through which exhaust gases pass in order to heat the plate and copper wool.

Still another object of the invention is to provide a vaporizing fuel system in accordance with the preceding objects which is efficient in operation, capable of being used with various types of internal combustion engines and effective for obtaining maximum performance from the engine while reducing emissions and increasing fuel economy.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
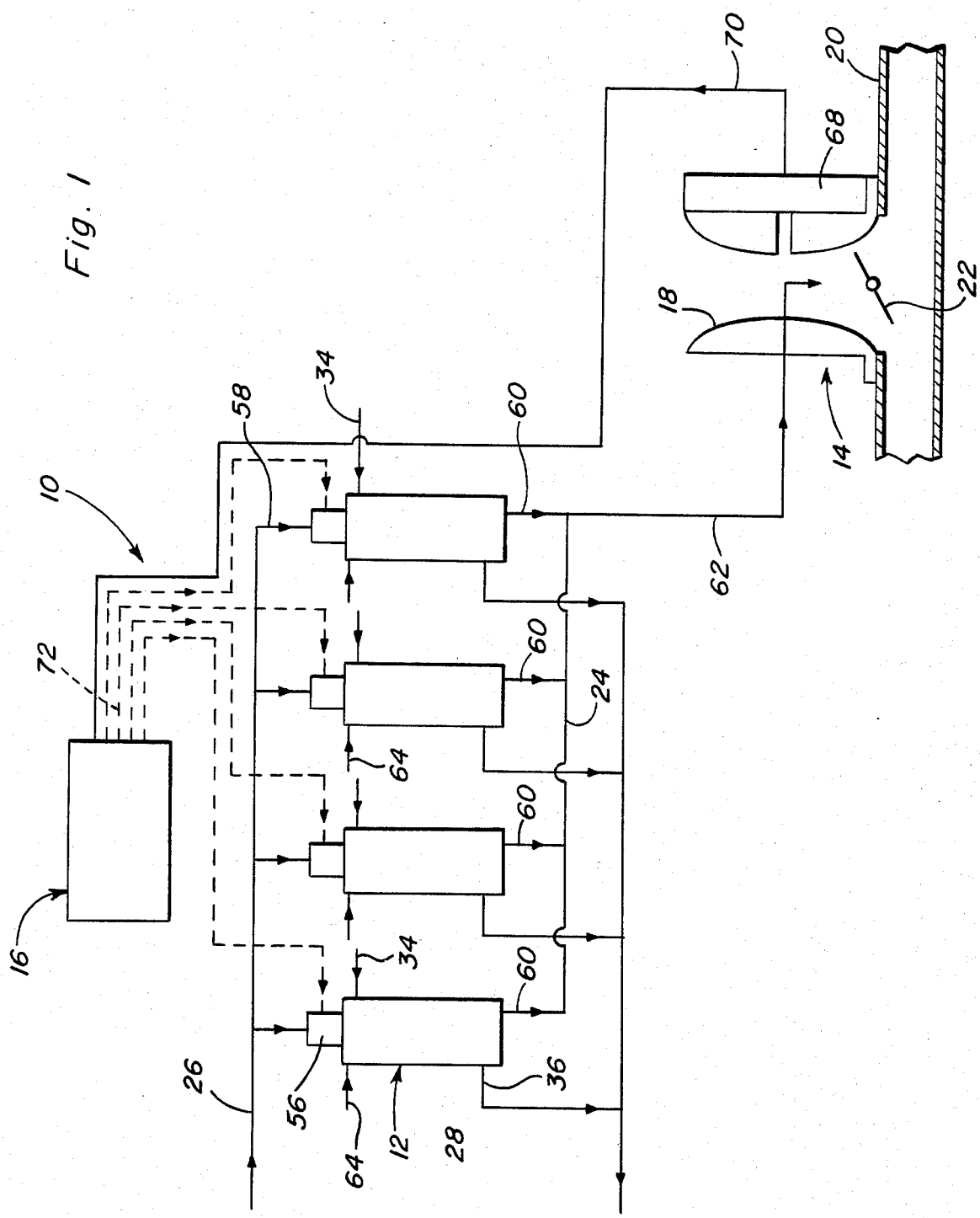
FIG. 1 is a schematic view of the vaporizing fuel system for internal combustion engines of the present invention illustrating schematically the association of the components of the system.

Referring now specifically to the drawings, the vaporizing fuel system for internal combustion engines of the present invention is generally designated by reference numeral 10 and includes a plurality of vaporizing chambers, each generally designated by reference numeral 12, associated with a carburetor 14 and controlled by a microprocessor 16. As illustrated schematically in FIG. 1, the carburetor 14 includes a venturi 18 that is mounted on and communicated with an intake manifold 20 of an internal combustion engine in a well known and conventional manner with a throttle valve 22 being provided adjacent the venturi 18 for controlling flow therethrough in response to actuation of an accelerator pedal in a well known and conventional manner. As illustrated, the vaporizing chambers 12 are arranged in parallel relationship with each of the vaporizing chambers being communicated with a common manifold 24 that extends to and communicates with the venturi 18. Each of the fuel vaporizers 12 is also communicated with a fuel supply manifold 26 connected with a suitable fuel pump or other fuel supply.

Figure 3:
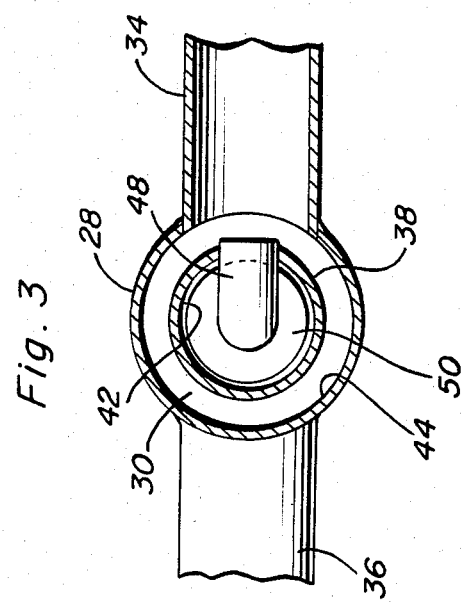
FIG. 3 is a transverse, sectional view taken substantially upon a plane passing along section line 3—3 on FIG. 2 illustrating further structural details of the vaporizing chamber.
Figure 4:
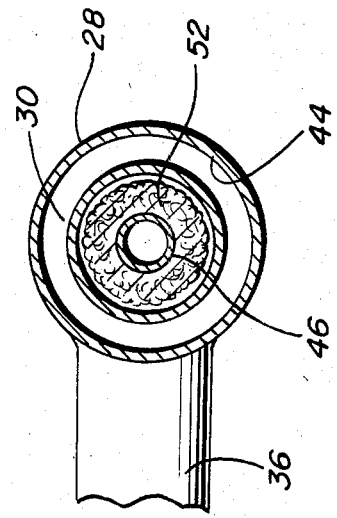
FIG. 4 is a transverse, sectional view taken substantially upon a plane passing along section line 4—4 on FIG. 2 illustrating further structural details of the vaporizing chamber.
Figure 2:
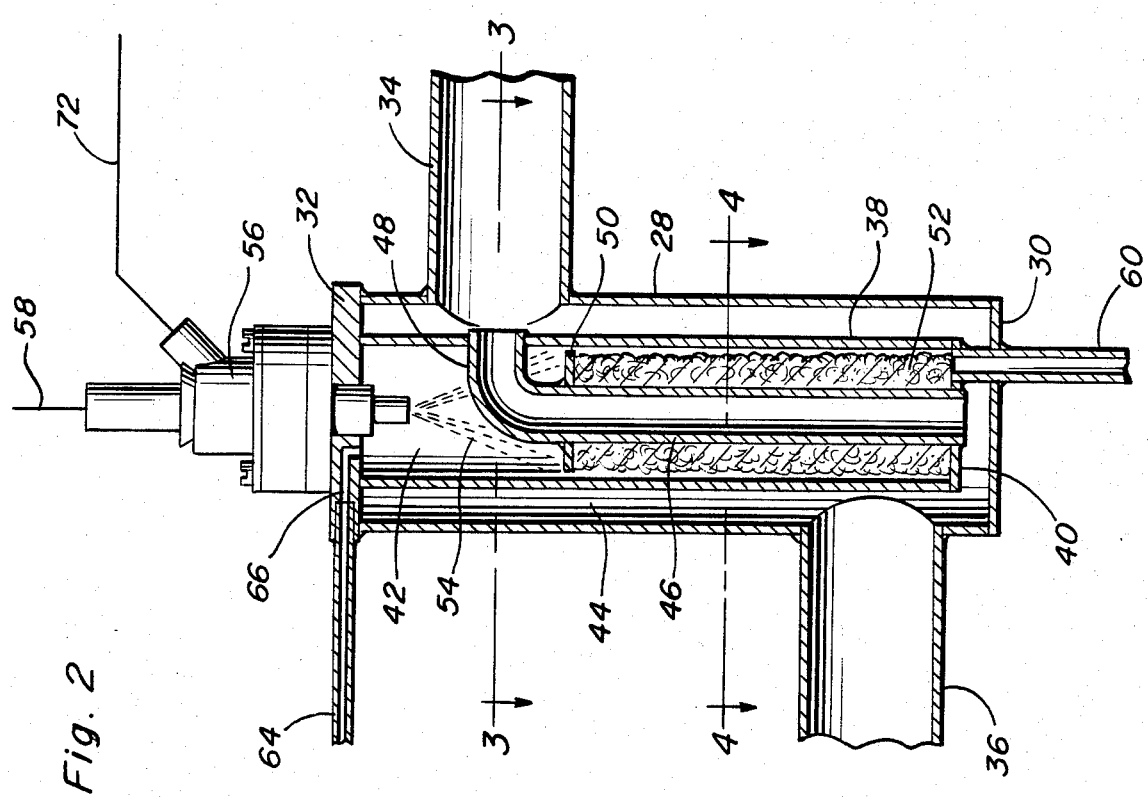
FIG. 2 is a vertical sectional view of one of the vaporizing chambers and associated structure.

FIGS. 2-4 disclose the specific details of construction of one of the vaporizing chambers 12 with it being understood that all of the vaporizing chambers 12 are of the same construction. The vaporizing chamber 12 includes an external cylindrical wall or casing 28 having a bottom wall 30 and a top wall 32. Adjacent the upper end of the outer wall or casing 28 an exhaust inlet 34 is provided in the form of a pipe extending radially of and connected with the cylindrical wall 28. Adjacent the lower end of the wall 28 is an exhaust outlet 36 in the form of a pipe connected to and communicated with the bottom of the cylindrical wall 28 in opposite relation to the exhaust inlet 34. Thus, exhaust products from the internal combustion engine will pass through the vaporizing chamber 12 from the inlet 34 to the outlet 36.

Positioned concentrically within the cylindrical wall 28 is an inner wall or casing 38 of cylindrical configuration having a lower end wall 40 and the upper end secured to and closed by the top wall 32 as illustrated in FIG. 2 thus forming an inner chamber 42 and an outer chamber 44 with the outer chamber receiving the exhaust products passing therethrough and the inner chamber 42 being isolated therefrom. Positioned concentrically with respect to the inner wall or casing 38 is a tube or pipe 46 having its lower end extending through and rigidly affixed to the bottom wall 40 of the inner casing 38. The upper end of the pipe turns at right angles as indicated by numeral 48 and extends through and is affixed to the inner casing 38 with the open end thereof in alignment with the exhaust inlet 34 so that exhaust products will also pass through the tube or pipe 46 from an inlet in alignment with the exhaust inlet 34 to an outlet in the space between the bottom wall 30 of the outer wall 28 and the bottom wall 40 on the inner wall 38. The exhaust products discharged from the pipe 46 will exit from the space 44 out through the exhaust outlet 36.

A circular metal plate 50 is secured to the outer surface of the pipe or tube 46 adjacent the right angle bend 48 as illustrated in FIG. 2 with the periphery of the plate 50 being spaced concentrically a small distance from the inner surface of the inner wall or casing 38. Positioned below the plate 50 and in contact therewith and completely filling the space 42 below the plate 50 and above the bottom 40 is a quantity of copper wool 52 which is in heat exchange relation to the plate 50, the tube or pipe 46 and the inner wall or casing 38 so that the exhaust products passing through the space 44 and passing through the pipe or tube 46 will thoroughly heat the plate 50 and the copper wool 52.

Liquid fuel 54 is injected downwardly onto the plate 50 and exposed surfaces of the upper end of the pipe 46 including the right angle bend 48 for initial and partial vaporization with the partially vaporized fuel then passing downwardly through the interstices in the copper wool 52 with the fuel being in heat exchange relation to the copper wool for final and complete vaporization of the fuel. The fuel is discharged into the vaporizing chamber or space 42 by an injector 56 mounted on the top wall 32 with the injector 56 receiving fuel from a fuel line 58 that is communicated with the fuel supply manifold line 26. The injector 56 may be supported on the top wall 32 in any suitable manner.

Vaporized fuel is discharged from the lower end of the space 42 through a discharge tube 60 that extends through and is fixedly secured to the bottom wall 40. The vaporized fuel discharge tube or line 60 is communicated with the common manifold 24 and is communicated with the venturi through a line 62 extending from the manifold 24 into the venturi 18 for discharge of vaporized fuel into the venturi 18. Air is admitted into the upper end of the space 42 through an air inlet tube 64 and a passageway 66 in the top wall 32 as illustrated in FIG. 2. The air admitted through the tube 64 and passageway 66 combined with and mixes with the fuel 54 as it is vaporized by impinging on the surfaces of the pipe 46 including the right angle portion 48 and the plate 50 and as it passes through the copper wool 52 for complete vaporization and mixing with the air for discharge through the tube 60 into the manifold 24 and through the line 62 into the venturi 18 for mixing with additional air and providing a combustible mixture through the intake manifold 20 as controlled by the throttle valve 22.

The injector 56 is of conventional construction and the fuel in supply line 58 is usually under a pressure generally of the order of 30 psig. Operation of the injectors is responsive to an output signal from the microprocessor control unit 16. The microprocessor control unit controls the quantity of fuel and receives data from a transducer 68 in the venturi through line 70 which is positioned to sense airflow, pressure and throttle position. The microprocessor then calculates a specific pulse "on" and "off" which is then sent to the appropriate fuel injector 56 through lines 72. The injectors 56 are staged or timed to provide the correct amount of fuel vapor for a given airflow and throttle condition. The total charge of vapor is combined in the vapor manifold 24 and discharged to the venturi 18 to combine with a measured volume of air entering and passing through the venturi 18 to provide accurate control for the fuel/air ratio. Various types of microprocessors may be utilized which are programmed to specifically control the injectors in accordance with the operating conditions of the engine as determined and sent by the transducer to the microprocessor which in turn controls operation of the injectors. Complete vaporization of the fuel occurs in the vaporizing chamber as the spray initially hits the plate and is partially vaporized and then passes through the space containing the copper wool for final vaporization with the vaporization taking place under vacuum induced by airflow through the venturi with excess air entering at pipe 64 and passageway 66.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A vaporizing fuel system for an internal combustion engine having an intake manifold, a carburetor with a venturi and throttle valve controlling flow of a combustible mixture into the intake manifold, a plurality of vaporizing chambers, each vaporizing chamber including a fuel injector for injecting a predetermined quantity of fuel into each vaporizing chamber in a timed sequence and in a spray pattern, each vaporizing chamber including means in heat exchange relation to the exhaust products from the internal combustion engine to vaporize the fuel in the vaporizing chamber and means communicating the vaporizing chambers with the venturi for discharging vaporized fuel to the venturi with the reduced pressure in the venturi inducing flow of vaporized fuel into the venturi from the vaporizing chambers, and means responsive to airflow through the venturi and the throttle valve setting to control injection of fuel by the injectors, said means controlling injection of fuel into the vaporizing chambers including a transducer associated with the venturi for sensing airflow and throttle valve condition and a microprocessor receiving data from the transducer and providing a signal to each of injectors for operating the injectors to discharge fuel into the vaporizing chambers, each vaporizing chamber including an outer casing defined by a cylindrical outer wall closed by a bottom wall and a top wall, said means in heat exchange relation to the exhaust products including an exhaust inlet communicating with the interior of the outer wall and an exhaust outlet communicating with the interior of the outer wall to provide flow of exhaust products through the vaporizing chamber, each vaporizing chamber also including a inner casing including an inner wall spaced concentrically from the outer wall and having the lower end closed by a bottom wall spaced from the bottom wall of the outer casing and the upper end secured to the top wall forming a closure for the outer wall, the lower portion of the inner casing being filled with copper wool with a plate engaging the upper surface of the copper wool with fuel being sprayed on the plate for initial vaporization with the partially vaporized fuel then passing downwardly around the edges of the plate and through the copper wool, said inner casing being provided with a discharge tube for vaporized fuel for communication with a common manifold extending to the venturi of the carburetor.

2. The system as defined in claim 1 together with an air inlet in the top wall of the outer casing in communication with the interior of the inner casing for admitting air into the vaporizing chamber for mixing with the vaporized fuel.

3. The system as defined in claim 2 together with a pipe extending vertically in the center of the inner casing with the copper wool in heat exchange relation thereto with the lower end of the pipe extending to and through the bottom wall of the inner casing and the upper end thereof being curved at a right angle and terminating in an open end extending through the inner wall in facing relation to the exhaust inlet for passage of exhaust products through the pipe for heating the copper wool from both the inside and outside, said plate engaging the upper surface of the copper wool being rigidly affixed to the pipe adjacent the upper end thereof in heat exchange relation thereto and in heat exchange relation to the copper wool with the injector discharging fuel in a spray pattern onto the plate and onto the upper end portion of said pipe for initial vaporization with complete vaporization occurring as the partially vaporized fuel passes through the heated copper wool.

4. A vaporizing chamber for supplying vaporized fuel to the venturi of a carburetor on an engine comprising an outer closed casing and an inner closed casing spaced from the outer casing to form a space, means introducing and circulating a heat exchange fluid through said space, means introducing fuel into the inner casing, said inner casing including a quantity of metallic wool filling a substantial length thereof with the fuel passing through the metallic wool for vaporization thereof with the metallic wool being heated by heat exchange contact with the outer periphery of the inner casing, and discharge means communicated with the inner casing for discharging vaporized fuel from the inner casing to the venturi of the carburetor.

5. The vaporizing chamber as defined in claim 4 together with means in the upper end of the inner casing to admit air into the inner casing for mixing with vaporized fuel for discharge into the venturi of the carburetor for mixing with additional air.

6. The vaporizing chamber as defined in claim 5 together with a metal plate engaged with the end surface of the metallic wool with the fuel being discharged on the plate in a spray pattern.

7. The vaporizing chamber as defined in claim 6 together with a central pipe extending through the metallic wool and plate and having a lower end and an upper end extending outwardly of the inner casing for circulation of heat exchange fluid therethrough for heating the metallic wool and plate.

8. The vaporizing chamber as defined in claim 7 wherein said means circulating heat exchange fluid includes an inlet and an outlet communicated with the outer casing with the inlet being adapted to be connected with an exhaust pipe for the exhaust products of the internal combustion engine for utilizing the heat in the exhaust products for vaporizing the fuel.

9. A vaporizing fuel system for an internal combustion engine having an intake manifold, a carburetor with a venturi and throttle valve controlling flow of a combustible mixture into the intake manifold, a plurality of vaporizing chambers, each vaporizing chamber including a fuel injector for injecting a predetermined quantity of fuel into each vaporizing chamber in a timed sequence and in a spray pattern, each vaporizing chamber including means in heat exchange relation to the exhaust products from the internal combustion engine to vaporize the fuel in the vaporizing chamber and means communicating the vaporizing chambers with the venturi for discharging vaporized fuel to the venturi with the reduced pressure in the venturi inducing flow of vaporized fuel into the venturi from the vaporizing chambers, and means responsive to airflow through the venturi and the throttle valve setting to control injection of fuel by the injectors, said means controlling injection of fuel into the vaporizing chambers including a transducer associated with the venturi for sensing airflow and throttle valve condition and a microprocessor receiving data from the transducer and providing a signal to each of the injectors for operating the injectors to discharge fuel into the vaporizing chambers, each vaporizing chamber including an outer wall closed by a bottom wall and a top wall, said means in heat exchange relation to the exhaust products including an exhaust inlet communicating with the interior of the outer wall and an exhaust outlet communicating with the interior of the outer wall to provide flow of exhaust products through the vaporizing chamber, each vaporizing chamber also including an inner wall spaced from the outer wall and having the lower end closed by a bottom wall spaced from the bottom wall which closes the lower end of the outer wall, the upper end of the inner wall being secured to the top wall forming a closure for the upper end of the outer wall, a substantial portion of the inner wall being filled with metal wool with fuel being sprayed into the upper end of the inner wall for vaporization as it passes downwardly through the metal wool, said inner wall being provided with a discharge tube for vaporized fuel for communication with the venturi of the carburetor, and means providing flow of exhaust products through the metal wool while isolating the exhaust products from direct contact with the metal wool for heating the metal wool.

* * * * *